Sept. 20, 1971  O. W. OLSON  3,606,254
VEHICLE BUMPER JACK

Filed June 20, 1969  2 Sheets-Sheet 1

Sept. 20, 1971   O. W. OLSON   3,606,254
VEHICLE BUMPER JACK

Filed June 20, 1969   2 Sheets-Sheet 2

United States Patent Office 3,606,254
Patented Sept. 20, 1971

3,606,254
VEHICLE BUMPER JACK
Oscar William Olson, 3613 37th Ave., NE., Apt. 306,
Minneapolis, Minn. 55421
Filed June 20, 1969, Ser. No. 834,962
Int. Cl. B66f 1/04
U.S. Cl. 254—111                                          8 Claims

ABSTRACT OF THE DISCLOSURE

A stable tripod vehicle bumper jack characterized by vertically adjustable rear support legs and a fixed foot movably supporting the jack column to permit variations of the angle of the jack column to compensate for differences due to lifting of the vehicle bumper. The adjustable supporting legs permit the jack to remain stable with the lifting member lying substantially in a vertical plane. The movable support for the lifting member avoids the necessity that the support legs move to compensate for the conventional change in the angle of the lifting member as the vehicle is raised.

---

This invention relates to an improvement in vehicle bumper jacks of the tripod design.

Bumper jacks have been known to tip over or slide out from under a lifted vehicle causing embarassing or serious results.

Single legged bumper jacks are known to be extremely unstable when supporting the load of a raised vehicle, especially on ground surfaces that are not level.

The double legged or bipod type jack was supposed to add stability to a raised vehicle in the fore and aft direction, but it is known that during lifting a load the jack pivots on the forward main lifting member causing the rear support leg to raise from the ground and not share the load. This condition is due to the angle offset from vertical, in the fore and aft direction of the main lifting member. This angle of offset of the main lifting member causes the bumper engaging lifting lug to have a horizontal displacement in the fore and aft direction, proportional to the vertical distance raised. Good safety practices dictate the vehicle to be braked while being raised. Therefore, as the bumper is raised the jack lifting lug causes the main lifting member to pivot forward in order to follow the vehicle bumper.

The tripod legged jack has the same inherent problem as the bipod jack in the fore and aft direction, since the main lifting leg is also offset from vertical. The tripod legged jack also introduced a possible unsafe lifting device if the ground surface is not level, since the 3 legs will seek out the lay of the ground and not retain the main lifting member at its safest and most stable angle.

Prior construction in tripod jacks will position the main lifting member at the optimum angle on flat surfaces only. When lifting a vehicle load on non-level ground, the main lifting member should be positioned vertical in the sideway direction, so both rear support legs share an equal load with the lifted vehicle force passing through the center of gravity of the triangle formed by the rear support legs and a horizontal line connecting their base. Also for maximum stability the main lifting member should remain tilted rearward at an angle offset from vertical in the fore-aft direction.

Many patents have been issued on bumper jacks and in particular on various ways of compensating for the horizontal movement of the bumper engaging lifting lug as exemplified by Townsend Pat. No. 3,240,471. However, these have had various disadvantages including overly complex mechanisms and no provisions to adjust the main lifting leg to an optimum angle for maximum stability on non-level ground surfaces. Another disadvantage is the method of connecting the resilient linkage joining the 3 legs. Existing devices connect the resilient linkage between the rear supporting legs to the main lifting member. As the main lifting member moves forward horizontally, the resilient linkage disturbs the rear supporting legs causing them to drag along the ground surface creating an unsafe condition if an obstruction or hole were in their path.

Therefore, it is the general object of this invention to provide a safer improved tripod type jack.

It is a further object of this invention to provide rear adjustable support legs to position the main lifting member at an optimum stable angle for non-level ground conditions.

It is a further object of this invention to provide a simple means to allow the main lifting member to be positioned by a leveling device.

It is a further object of this invention to provide a flexible linkage connection between the 3 supports which does not disturb their initial seating.

It is another object of this invention to provide an improved form of yieldable moving means flexibly supportably connected to the main lifting member, whereby upon application of the load the main lifting member will slide forward and the rear support legs will remain in contact with the ground surface.

It is a final object of this invention to provide a simple form of bumper engaging lifting lug flexibly connected to the main lifting member.

The following is a description of one version of a tripod base vehicle bumper jack utilizing the principles of this invention. It should be understood that these principles apply to jacks with lifting means different from the ratchet principle used in the drawings. It should also be understood that there are several other versions of adjusting the leg lengths, other than the ones described, that will be readily apparent to anyone skilled in the art.

Figure 1:
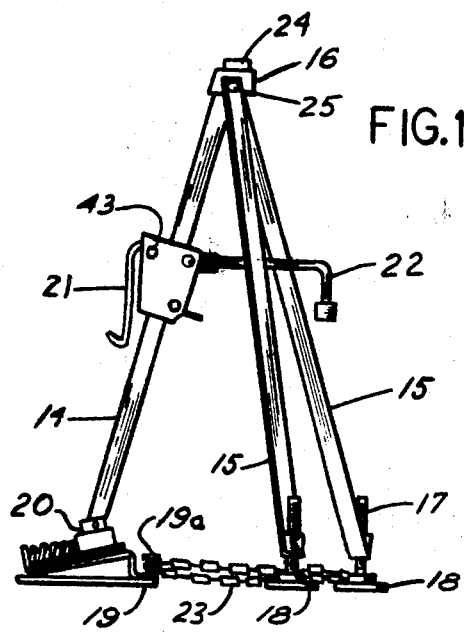
FIG. 1 is a side view of the vehicle bumper jack.
Figure 2:
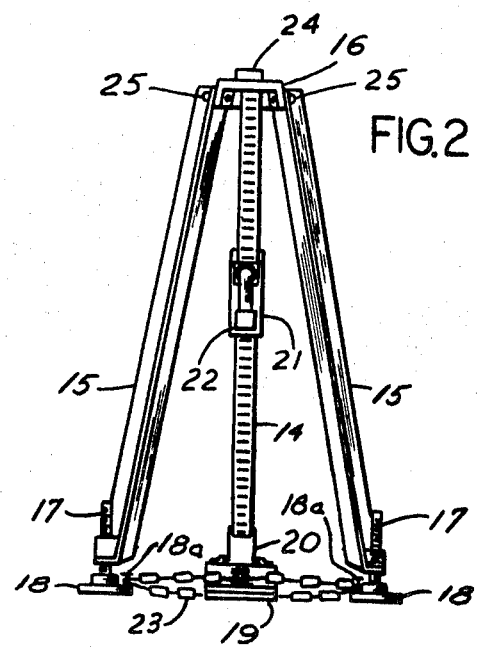
FIG. 2 is a rear view of FIG. 1.

Referring now to the drawings in detail. FIGS. 1 and 2 include main lifting member 14, rear support legs 15, top plate 16, adjusting screws 17, swivel base plate 18, main lifting member foot 19, saddle 20, bumper engaging lifting lug 21, handle 22, flexible chain 23 interconnecting swivel base plates 18 to main lifting member foot 19 by means of pins 18ª and 19ª and lifting lug attachment pin 43.

Figure 3:
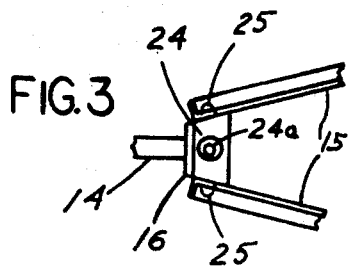
FIG. 3 is a partial top view of FIG. 1 showing top plate and pivoting of the rear support legs.

Top plate 16 of FIGS. 1, 2, and 3 is welded to main lifting member 14 at a fixed angle so as to provide a flat horizontal reference surface capable of accepting a bubble level 24 to indicate horizontal and assist the operator in adjusting the length of the rear support legs 15, on non level surface, to position the jack so the main lifting member 14 is vertical as viewed in FIG. 2. With the main lifting member vertical, both rear support legs equally share the lifted load allowing the load force to pass through the center of gravity of the triangle formed by rear support legs 15 and a line connecting the base of said legs. By centering the bubble 24ª in the bubble level 24, the operator can position the jack on non level surfaces to its most stable position. Top plate 16 of FIG. 3 is angled so support legs 15 will swing away and outward on pins 25 from main lifting member 14 to form a stable tripod structure.

Figure 7:
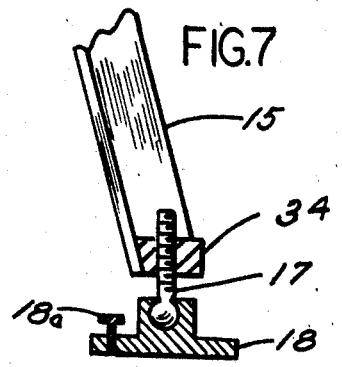
FIG. 7 is a partially cross sectioned view of the rear adjustable support leg.

FIGS. 1, 2 and 7 show a method of adjusting the length of rear support legs 15. In FIG. 7, the swivel base plate 18 has a captivating socket accepting the ball on the adjusting screw 17. Internal threaded support leg block 34 is welded to support leg 15. In operation, adjusting screws 17 are rotated till swivel base plates 18 contact ground surface with top plate 16 horizontal.

Figure 8:
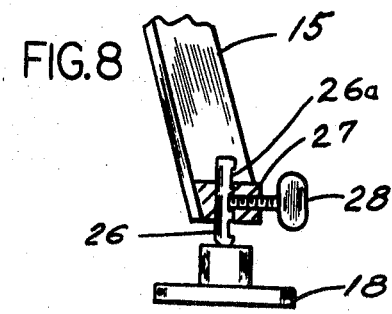
FIG. 8 is a partially cross-sectional view of a different rear adjustable support leg.

With reference to FIG. 8, another form of adjusting the support legs 15 is shown. Adjusting shaft 26 is connected to swivel base plate 18. Bored support leg block 27 is welded to support leg 15. Thumb screw 28 is threaded into bored support leg block and extend into one of the series of step in adjusting shaft 26ª. In operation, the thumb screws 28 are loosened and disengaged from slots 26ª in shaft allowing base plate 18 to contact ground surface while retaining the top plate 16 on a horizontal plane. With top plate 16 horizontal, thumb screws 28 are engaged into slots 26ª.

Figure 9:
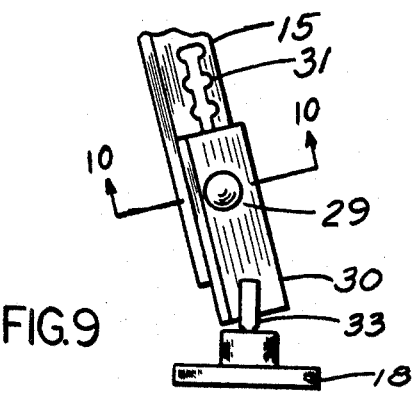
FIG. 9 is a view of a different rear adjustable support leg.
Figure 10:
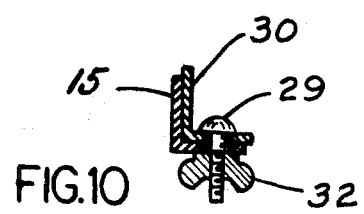
FIG. 10 is a section taken in the direction of arrows 10—10 of FIG. 9.

With reference to FIGS. 9 and 10 another form of adjustable means for support legs 15 is shown. Shoulder screw 29 is fastened securely to tail angle 30. The shoulder of the screw is elongated to engage into the series of slotted openings 31 provided in the support legs 15. Ball shaft 33 is attached to tail gate angle 30. Swivel base plate 18 contains a socket captivating ball on ball shaft 33. In operation, the length of the support legs 15 are adjusted by loosening thumb nut 32 and separating tail angle 30 with shoulder screw 29 from engagement with slotted opening in support legs 15. Maintaining top surface of top plate horizontal, the shoulder screw is engaged into slotted opening of support legs with ground plate in contact with ground surface. Thumb nut 32 is then tightened.

Figure 11:
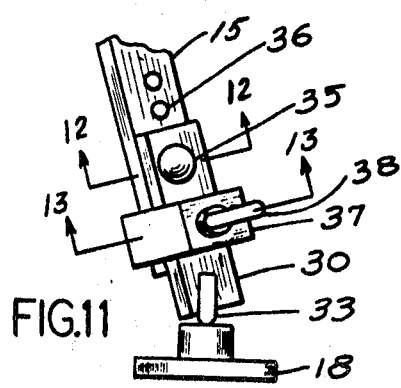
FIG. 11 is a view of a different rear adjustable support leg.
Figure 12:
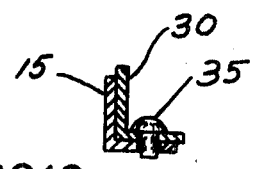
FIG. 12 is a section taken in the direction of arrows 12—12 of FIG. 11.
Figure 13:
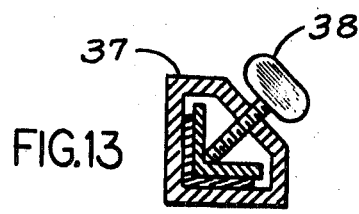
FIG. 13 is a section taken in the direction of arrows 13—13 of FIG. 11.

With reference to FIGS. 11, 12 and 13, another form of adjustable means for support legs 15 is shown. Rivet 35 of FIGS. 11 and 12 is fastened securely to tail angle 30 and engages into the series of holes 36 in rear support legs 15. Brace 37 of FIGS. 11 and 13 is permanently fastened to support leg 15. Thumb screw 38 of FIGS. 11 and 13 is threaded through brace 37 and tightened against tail angle 30 forcing rivet 35 to stay engaged in holes 36. Tail angle 30 is fastened to ball shaft 33. In operation the thumb screw 38 is loosened, tail angle 30 with rivet 35 is disengaged from support legs, with swivel base plates 18 in ground contact and top plate 24 horizontal the rivet is engaged into one of the series of holes 36 in support leg and the thumb screw is tightened.

Figure 14:
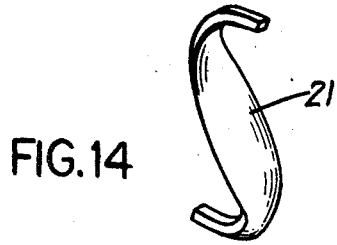
FIG. 14 is perspective view of the bumper engaging lifting lug.

FIG. 14 shows the bumper engaging lifting lug 21, which flexibly connects the vehicle bumper to the main lifting member. The lifting lug is free to pivot, fore and aft and sideways with respect to the vehicle, on pin 43 of FIG. 1. Actual tests have shown that the vehicle bumper tends to impose a bending moment through the conventional type lugs into the tripod structure causing the outside rear support leg to raise off the ground surface. This condition is due to the bumper traveling in a circular arc as it is raised. The pivot point of the arc is the side of the vehicle opposite that being raised. In operation, the lifting lug is swung outward with respect to the side of the vehicle being raised and is engaged under the bumper. As the bumper is raised and travels upward in a circular arc, the lifting lug returns to a vertical position parallel to the main lifting member and no bending moments are imposed into the tripod structure, since the vehicle load force passes through the center of gravity of the triangle formed by the two rear support legs and the horizontal line connecting their bases.

Figure 4:
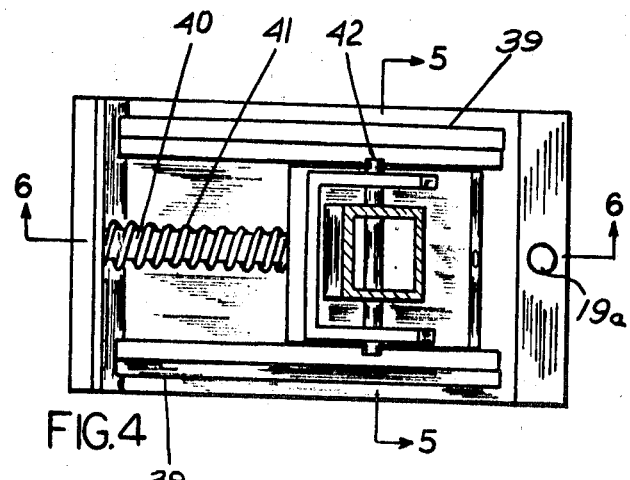
FIG. 4 is a top view of lifting bar support foot.
Figure 5:
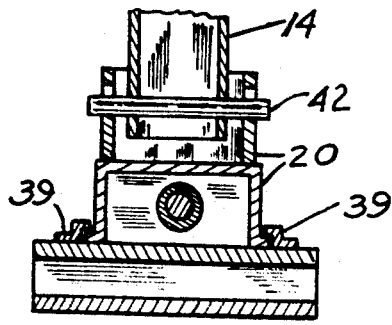
FIG. 5 is a section taken in the direction of arrows 5—5 of FIG. 4.
Figure 6:
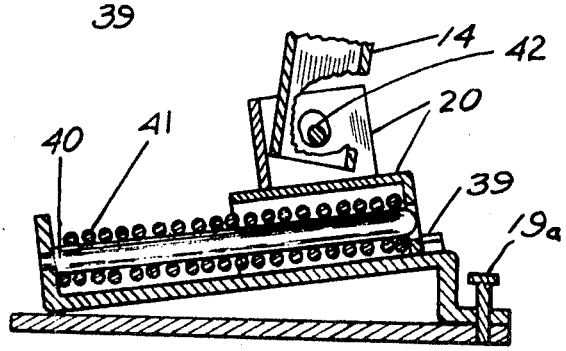
FIG. 6 is a section taken in the direction of arrows 6—6 of FIG. 4.

Referring now to the details of FIGS. 4, 5 and 6. Main lifting member foot 19 contains saddle guides 39 to guide saddle 20, flexible chain connecting pin 19ª, spring guide pin 40, saddle return spring 41 and main lifting member restraining pin 42. In operation, saddle return spring 41 retains saddle 20 on top of ramp toward rear support legs 15. As a vertically restrained load such as a vehicle bumper is raised, the bumper engaging lifting lug mechanism 21 is encouraged to move horizontally forward by the saddle 20 sliding down the ramp of the main lifting member foot 19. This horizontal displacement of the saddle prevents the main lifting member 14 from pivoting forward and lifting the swivel base plate off the ground. The saddle guides 39 guide the saddle movement. The main lifting member 14 is connected to the saddle 20 with a loose pin 42, allowing the main lifting member foot 19 to remain in contact with the ground surface and not be disturbed when adjusting the length of the rear support legs.

I claim:
1. A tripod type vehicle bumper jack comprising:
   (A) an elongated lifting member and a pair of rear support legs,
   (B) top plate means to which the top ends of each of said lifting member and supporting legs are pivotally secured for relative pivotal movement,
   (C) one ground contacting plate secured to the bottom end of said lifting member and a pair of ground contacting plates, one secured to the bottom end of each of said rear supporting legs, and
   (D) adjustment means for varying the lengths of said supporting legs.

2. A vehicle bumper jack according to claim 1 further characterized in that resilient linkage means interconnect said ground contacting plates to limit movement thereof.

3. A vehicle bumper jack according to claim 1 further characterized in that said first ground contacting plate includes means engaging the bottom end of said lifting member for movably supporting the lifting member.

4. A vehicle bumper jack according to claim 3 further characterized in that said means for movably supporting the lifting member comprises:
   (A) a saddle engaging the bottom end of the lifting member,
   (B) means for guiding said saddle for movement longitudinally of the vehicle with which the jack is used, and
   (C) resilient means for restraining longitudinal movement of said saddle.

5. A vehicle bumper jack according to claim 1 further characterized in that said means for adjusting the length of said rear support legs comprises:
   (A) externally threaded shafts engaging internal threads at the bottom ends of said legs,
   (B) a ball on each of said shafts, and
   (C) a socket on each of the ground contacting plates for said legs.

6. A vehicle bumper jack according to claim 1 further characterized in that said means for adjusting the lengths of the rear supporting legs comprises:
   (A) a multiple notched shaft engaging the bottom end of each of said support legs,
   (B) screw means in said legs engageable with said notches,
   (C) a ball on each of said shafts, and
   (D) a socket on each of the ground contacting plates for said legs.

7. A tripod type vehicle bumper jack comprising:
   (A) an elongated lifting member having lifting means movable along the member and means for moving the lifting means,
   (B) ground engaging means including three ground contacting plates, one of said plates being secured to the bottom end of said lifting member and the other two plates being secured to the bottom ends of a pair of rear support legs,
   (C) top plate means for securing the upper end of said lifting member to the upper ends of said support legs for pivotal movement relative thereto,
   (D) means movably supported in said first ground contacting plate for movably supporting the bottom end of said lifting member,
   (E) adjustment means for varying the length of said rear support legs, and
   (F) linkage means resiliently connecting said ground contacting plates to limit movement thereof.

8. A vehicle bumper jack according to claim 7 further characterized in that said means for movably supporting the lifting member comprises:
   (A) a saddle engaging the bottom end of the lifting member,
   (B) means for guiding said saddle for movement longitudinally of the vehicle with which the jack is used, and
   (C) resilient means for restraining longitudinal movement of said saddle.

References Cited
UNITED STATES PATENTS

| | | | |
|---|---|---|---|
| 2,774,567 | 12/1956 | Shroyer | 254—99 |
| 3,240,471 | 3/1966 | Townsend | 254—99 |
| 3,309,063 | 3/1967 | Cole | 254—99 |

ROBERT C. RIORDON, Primary Examiner

D. R. MELTON, Assistant Examiner

U.S. Cl. X.R.

254—Dig. 1